Oct. 20, 1959  J. E. ZIMMERMAN  2,909,220
HOUSE TRAILER AWNING

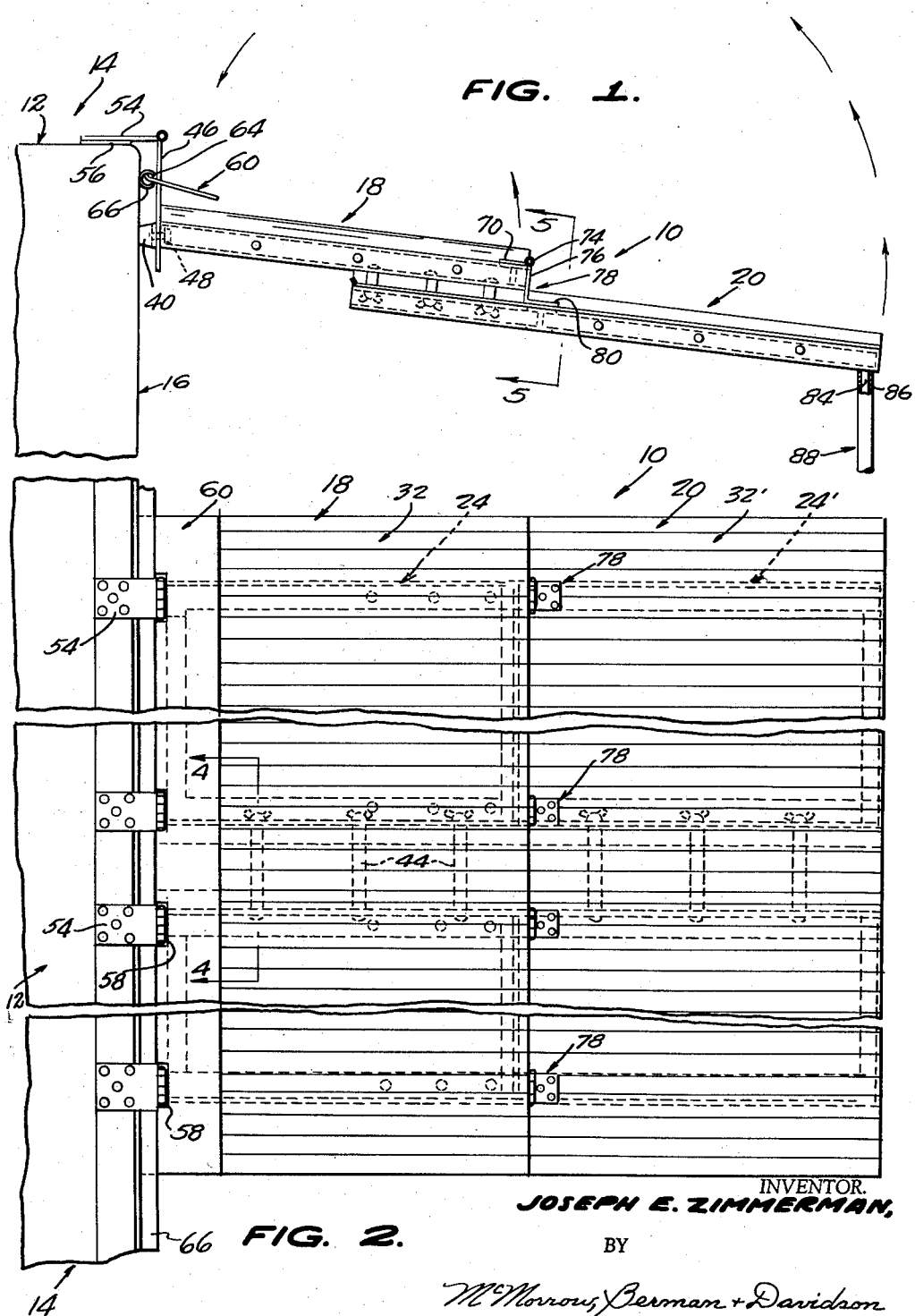

Filed Feb. 21, 1958  2 Sheets-Sheet 2

INVENTOR.
JOSEPH E. ZIMMERMAN,
BY
McMorrow, Berman & Davidson
ATTORNEYS.

United States Patent Office 2,909,220
Patented Oct. 20, 1959

2,909,220

HOUSE TRAILER AWNING

Joseph E. Zimmerman, Kent, Wash.

Application February 21, 1958, Serial No. 716,615

3 Claims. (Cl. 160—213)

This invention relates to improvements in foldable awnings, and more particularly to a foldable metal awning for house trailer bodies which is foldable onto the tops of the bodies when not in use.

The primary object of the invention is to provide an efficient and practical awning of this kind which is of compact and small bulk when folded, and which is disposable, when so folded, onto the top or roof of a house trailer body so as to avoid taking up room within the trailer body.

Another object of the invention is to provide an awning of the character indicated above which involves two foldable sections composed of laterally adjacent panels which can be assembled to provide an awning of desired length, the foldable sections being rigidly connected and secured to each other in the unfolded condition of the sections, and means being provided to secure the sections together when folded.

Other important objects and advantageous features of the invention will be apparent from the following description and the accompanying drawings, wherein, for purposes of illustration only, a specific form of the invention is set forth in detail.

In the drawings:

Figure 1 is a fragmentary end elevation, showing an awning of the invention installed on a house trailer body and in unfolded operative position at a side of the trailer body;

Figure 2 is a fragmentary contracted top plan view of Figure 1;

Figure 3:
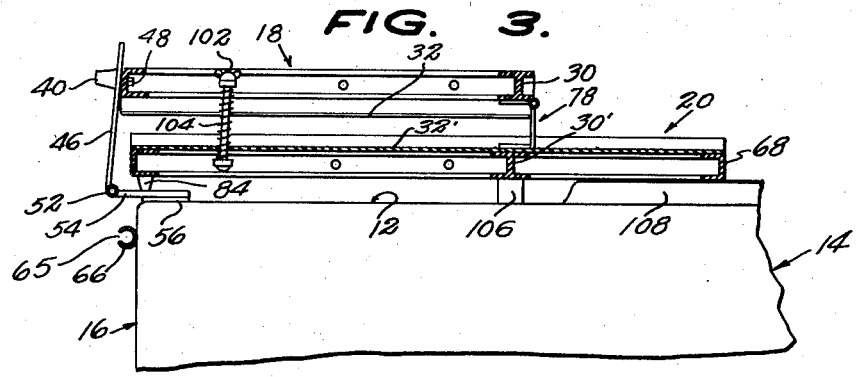
Figure 3 is an elevation of the opposite end of the trailer body that shown in Figure 1, the awning being in folded condition and folded onto the top of the trailer body, and shown in vertical transverse section.

Referring in detail to the drawings, wherein like numerals designate like parts throughout the several views, the illustrated awning, generally designated 10, is shown as installed on the roof or top 12 of a house trailer body 14, having a side wall 16.

The awning 10 involves an inboard or upper section 18, and an outboard or lower section 20, the lower or outboard section 20 being preferably wider than the upper or inboard section 18. Otherwise, the sections 18 and 20 are of generally similar construction, and each being composed of at least two laterally adjacent panels 22 secured together.

The upper or inboard section 18 comprises two laterally adjacent and longitudinally spaced panels 22, each composed of a rectangular frame 24 involving an inboard or inner longitudinal channel bar 26, transverse side channel bars 28, and an outboard or outer I-bar 30, secured together in any suitable manner. Fixed to the top sides of the bars of the frame 24, in any suitable manner, as by welding, are sheets 32 of corrugated metal or plastic, whose corrugations 34 run transversely of the awning or away from the trailer body 14, and whose troughs 36 serve as drains for rain or melting snow. The corrugated sheets 32 terminate at the inward and outward sides of the bars 26 and 30, but extend longitudinally beyond the side bars 28, as shown in Figure 2, and portions of corrugated sheets of adjacent panels 22 are over-lapped, as indicated at 38, in Figure 4. Bumpers 40 are fixed on the inboard bars 26 of the frames 24 for engaging the side wall 16 of the trailer body 14 at points spaced below the body top 12, as shown in Figure 1, so as to hold the upper awning section 18 away from the side wall 16.

Figure 4:
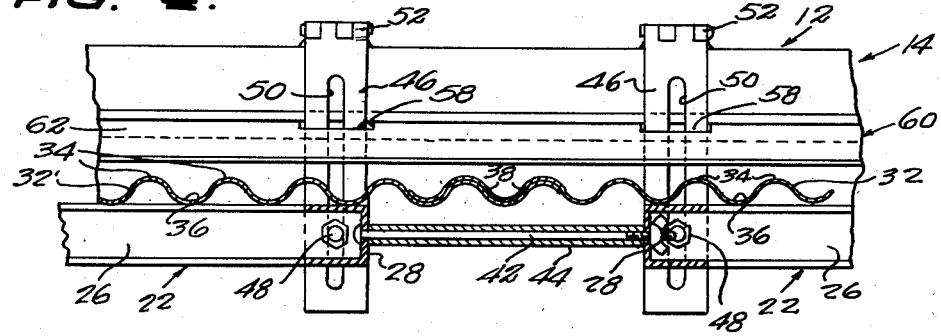
Figure 4 is an enlarged fragmentary vertical longitudinal section taken on the line 4—4 of Figure 2.
Figure 5:
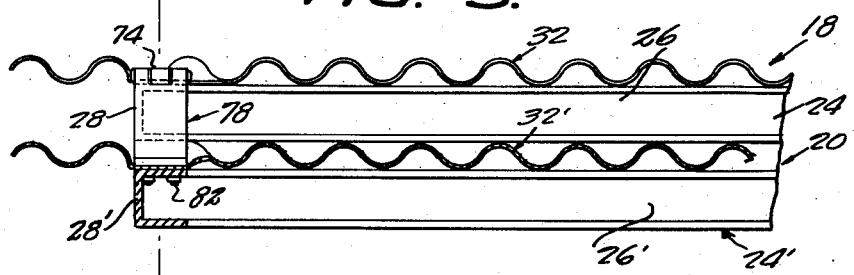
Figure 5 is an enlarged fragmentary vertical longitudinal section taken on the line 5—5 of Figure 1.

The panels 22 are spaced from each other and connected together by bolts 42 extending through the webs of adjacent channel side bars 28, as shown in Figure 4, and having thereon spacer sleeves 44 abutting said webs.

Secured to the inboard sides of the inner channel bars 26 of the frames 24 are the lower ends of vertically elongated hinge leaves 46, by means of bolts 48 traversing the webs of the bars 26, at the inner ends of the frame side bars 28. The bolts 48 extend through vertically elongated slots 50 in the hinge leaves 46, whereby vertical adjustments of the inboard awning section 18 relative to the trailer body top 12 are provided for.

The hinge leaves 46 are hinged at their upper ends at 52 to the outboard or outer ends of shorter, normally horizontal hinge leaves 54. The hinge leaves 54 are fixed, in any suitable manner upon the trailer body top 12, preferably, with a spacer strip 56 intervening, at points close to the side wall 16.

The vertical hinge leaves 46 extend slidably through slots 58 in a rain guard 60, which comprises a longitudinally elongated horizontal plate 62, extending the length of the upper awning section 18, above the corrugated sheets 32 thereof, and removably engaged at its raised rear edge 64 in a slot 65 in a tube 66 secured to the body side wall 16, with the rain guard 60 disposed in an outboardly declining position, as shown in Figure 1. The vertical hinge leaves 46 are secured to the inboard ends of the frames 24 at an angle, so that the upper awning section 18 extends away from the body side wall 16 at an outboardly declining angle, for draining purposes, as also shown in Figure 1.

The lower or outboard awning section 20 is substantially similar to the upper or inboard section 18, except that the side bars 28' of its frames 24' are extended outboardly or outwardly beyond the outer I-bars 30' and are connected at their outer or outboard ends by outer channel bars 68, and the corrugated sheets 32' thereof reach to the bars 68, so that the lower awning section 20 is substantially wider than the upper section 18. The I-bars 30' of the lower awning section 20 are closer to the inboard or inner bars 26' of the frames 24' than are the I-bars 30 of the upper section frames 24 to their inner bars 26.

Secured at 72 upon the tops of the I-bars 30 of the upper awning section 18, in line with the hinge leaves 46, are upper hinge leaves 70, hinged at their outer ends, at 74, to the upper ends of the vertical legs 76 of L-shaped hinges 78 having horizontal legs 80, so that the vertical legs 76, at times, can abut the outboard sides of the outer I-bars 30 of the upper awning section frames 24, as shown in Figure 1, with the horizontal legs 80 spaced below the upper awning section 18. The horizontal legs 80 of the hinges 76 are secured, as indicated at 82, in Figure 6, upon the upper sides of related side bars 28' over the I-bars 30' of the frames 24' of the lower awning section 20, as shown in Figure 6.

Secured to and depending from the outer bars 68 of the frames 24' of the lower awning section 20 are lugs 84 arranged to receive the upper tubular ends 86 of awning posts 88 which are arranged to rest upon the ground, for stabilizing the awning 10 in its unfolded operative position, as shown in Figure 1.

Figure 6:
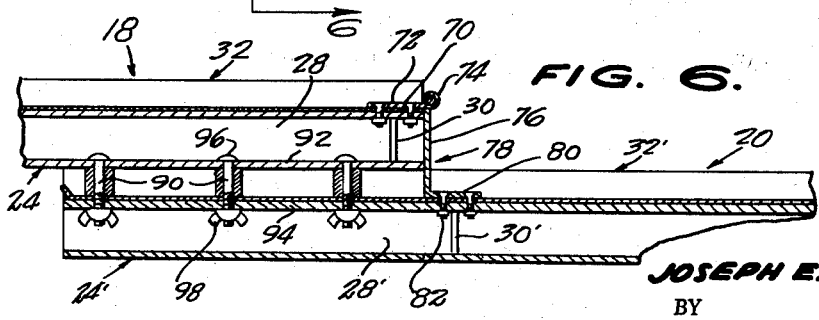
Figure 6 is a fragmentary vertical transverse section taken on the line 6—6 of Figure 5.

The lower awning section 20, as shown in Figures 1 and 6, is secured in coplanar spaced relation to the upper awning section 18, in the operative position of the awning 10, by means of several wing bolts 90 which traverse the vertically adjacent flanges 92 and 94, of vertically aligned upper and lower frame side bars 28 and 28' at points spaced therealong. The bolts 90 preferably have heads 96 bearing upon the upper sides of the flanges 92, and wing nuts 98 bearing against the undersides of the flanges 94. The bolts 90 have thereon tubular spacers 100 which engage and parallelly space the flanges 92 and 94, and tightening of the bolts 90 holds the upper and lower awning sections 18 and 20 securely in their unfolded operative relation. Removal of the wing nuts 98 frees the lower awning section 20 to be swung upwardly and inboardly or inwardly relative to the upper awning section 18.

With the lower or outboard awning section 20 folded onto the upper or inboard awning section 18, the two together are adapted to be connected by one or more bolts 102 passed through flanges of related side bars 28 and 28', as shown in Figure 3, the bolts 102 having thereon coil springs 104 serving to yieldably hold the sections 18 and 20 apart. The sections 18 and 20 can then be folded together onto the trailer body top 12, which is provided with an upstanding stop 106 thereon to be engaged by the lower awning section 20, so as to space the same from a ventilator 108 on the body top 12, as shown in Figure 3. Any suitable means, not shown, can be used to hold the folded awning sections 18 and 20 in place on the body top 12.

To obtain a desired length of awning, as many panels 22 and 22', for the upper and lower awning sections 18 and 20, respectively, can be connected together, as by the bolts 42 and spacers 44, as may be necessary.

While there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, a trailer body having a top wall and a side wall, an awning comprising inner and outer sections having inner and outer ends, first hinge means connecting the outer end of the inner section to the outer section at a point intermediate the inner and outer ends of the outer section, the outer section having an inner end portion arranged to bear supportably against the underside of the inner section only in the unfolded condition of the sections, said outer section being foldable upwardly and inwardly onto said inner section, and second hinge means secured to the inner end of the inner section and to the body top wall and enabling the inner and outer sections in folded condition to be swung upwardly and inwardly onto the body top wall to a storage position wherein the outer section rests supportably on the body top wall.

2. In combination, a trailer body having a top wall and a side wall, an awning comprising inner and outer sections having inner and outer ends, first hinge means connecting the outer end of the inner section to the outer section at a point intermediate the inner and outer ends of the outer section, the outer section having an inner end portion arranged to bear supportably against the underside of the inner section only in the unfolded condition of the sections, said outer section being foldable upwardly and inwardly onto said inner section, and second hinge means secured to the inner end of the inner section and the body top wall and enabling the inner and outer sections in folded condition to be swung upwardly and inwardly onto the body top wall to a storage position wherein the outer section rests supportably on the body top wall, said second hinge means comprising an inner horizontal hinge leaf secured upon the body top wall and projecting laterally outwardly beyond said side wall, and an outer hinge leaf hinged on the outer end of the inner hinge leaf, and bolt and slot adjustable means securing said outer hinge leaf to the inner end of the inner awning section.

3. In combination, a trailer body having a top wall and a side wall, an awning comprising inner and outer sections having inner and outer ends, means connecting the outer end of the inner section to the outer section at a point intermediate the inner and outer ends of the outer section, the outer section having an inner end portion arranged to bear supportably against the under side of the inner section only in the unfolded condition of the sections, said outer section being foldable upwardly and inwardly onto said inner section, and means secured to the inner end of the inner section and to the body top wall enabling the inner and outer sections in folded condition to be swung upwardly and inwardly onto the body top wall to a storage position wherein the outer section rests supportably on the body top wall.

References Cited in the file of this patent

UNITED STATES PATENTS

| 1,752,571 | Olson | Apr. 1, 1930 |
| 2,706,132 | Chaffin | Apr. 12, 1955 |
| 2,808,065 | Ellis | Oct. 1, 1957 |

FOREIGN PATENTS

| 433,590 | Great Britain | Aug. 16, 1935 |